United States Patent [19]

Fujita et al.

[11] Patent Number: 5,059,630

[45] Date of Patent: Oct. 22, 1991

[54] METHODS FOR MANUFACTURE OF POROUS RESIN MOLDINGS, ULTRAFINE FIBERS AND ULTRAFINE FIBER NONWOVEN FABRICS

[75] Inventors: Takeshi Fujita; Chuzo Isoda; Sejin Pu, all of Kyoto, Japan

[73] Assignee: Dai-Ichi Kogyo Seiyaku Co., Ltd., Kyoto, Japan

[21] Appl. No.: 636,813

[22] Filed: Jan. 2, 1991

[30] Foreign Application Priority Data

| Jan. 9, 1990 | [JP] | Japan | 2-2904 |
| Jan. 9, 1990 | [JP] | Japan | 2-2905 |
| Jan. 9, 1990 | [JP] | Japan | 2-2906 |
| Apr. 13, 1990 | [JP] | Japan | 2-98088 |

[51] Int. Cl.$^5$ .............................................. C08J 9/26
[52] U.S. Cl. ........................................ 521/61; 521/62; 521/134; 521/137; 521/138; 521/139; 264/49
[58] Field of Search ............... 521/61, 184, 137, 138, 521/189, 62

[56] References Cited

U.S. PATENT DOCUMENTS

| 4,100,238 | 7/1978 | Shinomura | 521/61 |
| 4,868,222 | 9/1989 | Chau et al. | 521/61 |

FOREIGN PATENT DOCUMENTS

| 54-27058 | 3/1979 | Japan . |
| 55-746 | 1/1980 | Japan . |
| 57-35906 | 2/1982 | Japan . |
| 61-212305 | 9/1986 | Japan . |
| 1-20262 | 4/1989 | Japan . |

*Primary Examiner*—Morton Foelak
*Attorney, Agent, or Firm*—Jordan and Hamburg

[57] ABSTRACT

This invention relates to methods for porous resin moldings, for ultrafine fibers for ultrafine fiber nonwoven fabrics. In essence, the invention comprises providing a molding, spun fiber or crude nonwoven fabric containing a thermoplastic resin and a special high molecular compound which has an adequate affinity for the thermoplastic resin and able to dissolve rapidly in water and dissolving out the high molecular compound from the molding, spun fiber or crude nonwoven fabric. The method of the invention involve no risk of explosion or fire hazard in manufacture, free from adverse effects on health, and help curtail the manufacturing time.

8 Claims, No Drawings

METHODS FOR MANUFACTURE OF POROUS RESIN MOLDINGS, ULTRAFINE FIBERS AND ULTRAFINE FIBER NONWOVEN FABRICS

BACKGROUND OF THE INVENTION

The present invention relates to methods for the manufacture of porous resin moldings, ultrafine fibers and nonwoven fabrics based on ultrafine fibers.

Heretofore, the following techniques are known for the manufacture of ultrafine-porous products from thermoplastic resins.

(1) The sintering process, in which a finely divided resin material is sintered;

(2) the solution process, which comprises dissolving a material resin in a solvent, adding a non-solvent thereto, coating a substrate, such as a nonwoven fabric, with the resulting mixture, and evaporating the solvent;

(3) the extraction process, which comprises mixing either a liquid or a solid into a material resin, molding the resin into a shaped article and extracting out the added liquid or solid;

(4) the drawing process, in which a crystalline polymer is formed into a film and stretched to give a porous product; and (5) the process which comprises dispersing an inorganic salt in a material resin and dissolving out the inorganic salt with water.

Among these techniques, the extraction method includes the following versions. For example, Japanese Kokai Patent Publication No. 57-35906 discloses a method in which a substantial quantity of polyethylene glycol is added to a film-forming solution and, after the formation of film, the polyethylene glycol is extracted out to leave a porous product. Japanese Kokai Patent Publication No. 55-746 describes a process in which a polyolefin and a water-soluble substance such as pentaerythritol are mixed under heating and, after molding, the water-soluble substance is extracted with water. Furthermore, Japanese Kokai Patent Publication No. 61-212305 describes a process in which a polysulfone resin and a water-soluble carboxylic acid are mixed together and, after the formation of film, the carboxylic acid is extracted with water.

Aside from the above, Japanese Patent Publication No. 1-20262 discloses a process for production of porous polyester fiber in which a small proportion of a polyalkylene ether (the molecular weight of polyethylene oxide: 2,000,000) is blended with the polyester and, then, extracted out with alkali.

However, in practicing these prior art extractive processes for the manufacture of ultrafine-porous products, much labor and time are required in order that the extraction of polyethylene glycol, for instance, can be complete and thorough. Moreover, when a large amount of polyethylene glycol is used, excessive porosity is produced to seriously impair the mechanical strength of product film. Furthermore, when a polyethylene oxide of high molecular weight is employed, the dissolution rate of this substance with respect to water is so low that an aqueous solution of alkali must be employed for extraction, for instance. However, the extraction rate is not high enough and the disposal of spent alkaline liquor presents another problem.

Meanwhile, ultrafine fiber has been finding application in a diversity of uses, such as high-performance filters, artificial leather, nonwoven fabrics, noble woven or knitted garments, and so on.

For the manufacture of ultrafine fiber, there is known a method which comprises melt-spinning a polyester and either a polyamide or a polyolefin in a composite spinning fashion and, then, removing the polyamide or polyolefin with an acid or a solvent by way of selective dissolution. However, since the inter-polymer affinity is low, delamination tends to take place in the course of spinning, and in connection with the process for dissolution, corosion of the equipment and adverse effects on the physiology of man are constant causes for concern.

In the process employing a polyester copolymerized with a large proportion of polyethylene glycol as a segment to be subsequently removed by dissolution, a large amount of white powder is produced in the stage of false twisting to interfere with the operation.

Meanwhile, fabrics constructed with such ultrafine fiber are being used in an ever-increasing variety of uses, such as artificial leather, water-repellent and water vapor-permeable clothing, special filters, masks, high-heat insulations and so on.

The common technology for manufacturing such fabrics comprises extruding two different types of resin from a special spinneret nozzle to produce a composite fiber with a core-sheath arrangement or islet-ocean sectional pattern of polymers and, either after or before construction of a fabric, removing one of the component resins by extraction with an organic solvent or an aqueous acid or alkali solution. (cf. Japanese Kokai Patent Publication No. 54-27058)

However, these technologies have their own drawbacks, viz. (1) it takes a great deal of time and labor to thoroughly extract a resin, (2) the use of an organic solvent such as toluene, trichloroethylene or the like presents problems in terms of environment and safety and extraction with an acid or alkali involves a sophisticated procedure unless the resin is acid/alkali-degradable and a problem in connection with the disposal of spent liquor, (3) for the manufacture of nonwoven fabrics, the use of an adhesive resin for inter-fiber bonding is limited by the fact that the adhesive resin must not be soluble in the extraction solvent.

SUMMARY OF THE INVENTION

It is an object of the present invention to simplify the manufacturing processes for porous resin articles, ultrafine fiber and nonwoven fabrics of ultrafine fiber by using a high molecular compound insuring an appropriate viscosity on melting and a high dissolution rate with respect to water and possessing an adequate affinity for thermoplastic resins and, for that matter, to improve the working environment.

It is another object of the present invention to expand the freedom of choice in regard to the melt-bonding resin or binder resin as far as the manufacture of nonwoven fabrics is concerned.

The method of the invention for the manufacture of a porous resin article comprises melt-blending (a) a thermoplastic resin (hereinafter referred to as component A) with (b) a high molecular compound having a weight average molecular weight of not less than 10,000 which is obtainable by reacting a polyoxyalkylene compound, which is available on addition polymerization of an organic compound containing two active hydrogen groups and an alkylene oxide containing ethylene oxide, with a polycarboxylic acid, an anhydride or a lower alkyl ester thereof, or a diisocyanate (hereinafter referred to as component B), molding the resulting blend, and removing said component B from the molding by dissolution with water or an aqueous medium.

The method of the present invention for the manufacture of ultrafine fiber comprises providing a spun fiber containing (c) at least one member selected from the group consisting of polyester, polyamide and polyacrylonitrile (hereinafter referred to as component C) and
said component B
and removing said component B by dissolution with water or an aqueous medium.

The method of the invention for the manufacture of a nonwoven fabric of ultrafine fiber comprises providing a spun fiber containing said component C and component B, constructing a crude nonwoven fabric using said spun fiber, and removing said component B from said crude nonwoven fabric by dissolution with water or an aqueous medium.

The component B employed in the present invention shows an appropriate viscosity when melted, has an adequate affinity for thermoplastic resin, dissolves quickly in water, and gives a spent liquor harmless to the environment. Furthermore, component B offers a great freedom of design tailored to various performance requirements, enabling the industry to control its melt viscosity and its affinity for skeletal polymers with a great latitude.

DETAILED DESCRIPTION OF THE PREFERRED EMBODIMENTS

Regarding the thermoplastic resin which is the component A according to the invention, any and all of the thermoplastic resins generally known can be employed. Thus, vinyl, polystyrene, polyethylene, polypropylene, polyacetal, acrylic, polyamide, polyester, cellulosic, polycarbonate, fluoroplastic, polyurethane, silicone, polyether ether ketone, polyphenylene oxide, polyethersulfone and diallyl phthalate polymers can be mentioned by way of example.

The polyalkylene oxide compound which is used as a principal starting material in the preparation of the pore-leaving resin (the resin to be dissolved out). viz. component B according to the invention, can be prepared by addition reaction of an ethylene oxide-containing alkylene oxide to an organic compound having two active hydrogen groups.

Among said organic compound having two active hydrogen groups are ethylene glycol, propylene glycol, polyethylene glycol, polypropylene glycol, butylamine, polytetramethylene glycol, aniline and so on.

The ethylene oxide-containing alkylene oxide which is addition-polymerized with such organic compound having two active hydrogen groups is either ethylene oxide as such or an ethylene oxide-containing alkylene oxide. The alkylene oxide other than ethylene oxide preferably contains 3 to 30 carbon atoms. Thus, for example, propylene oxide, butylene oxide, styrene oxide, $\alpha$-olefin ($C_{3-30}$) oxide and glycidyl ethers of 3 to 30 carbon atoms can be mentioned. The proportion of ethylene oxide is optional but in cases where component B is to be dissolved out with water, it is preferably in the range of 70 to 100 percent by weight relative to the total alkylene oxide.

The addition polymerization between such alkylene oxide and said organic compound having two active hydrogen groups is carried out in the conventional manner.

The weight average molecular weight of the polyalkylene oxide thus obtained is preferably not less than 100. If the weight average molecular weight is less than 100, the objects of the invention may not be certainly accomplished.

As to the polycarboxylic acid or a lower alkyl ester thereof, which is to be reacted with this polyalkylene oxide compound, phthalic acid, isophthalic acid, terephthalic acid, sebacic acid, etc. and the corresponding dimethyl esters and diethyl esters can be mentioned by way of example. Examples of the anhydride of polycarboxylic acid include pyromellitic and other tetracarboxylic anhydrides.

The diisocyanate to be reacted with the polyalkylene oxide compound includes any and all common diisocyanates such as tolylene diisocyanate, hexamethylene diisocyanate, diphenylmethane diisocyanate, isophorone diisocyanate and so on. Furthermore, the isocyanato-terminated urethane prepolymers obtainable by preliminary reaction of such diisocyanates with, for example, polypropylene glycol are also subsumed in the concept of diisocyanate in the present invention.

The polyesterification reaction between said polyalkylene oxide compound and said polycarboxylic acid, anhydride or lower alkyl ester and the polyurethanation reaction between said polyalkylene oxide compound and said diisocyanate are liable to accompany thermal decomposition and are, therefore, preferably conducted in the absence of oxygen in a closed reactor.

The proportions of the reactants, namely said polyalkylene oxide compound and said polycarboxylic acid, anhydride or lower alkyl ester or said diisocyanate, are optional, only if the weight average molecular weight of the product high molecular compound (component B) will not be less than 10,000.

Mixing of component A (thermoplastic resin) with component B (the resin to be dissolved out) is generally carried out in an autoclave at a temperature higher than the softening points of the respective components by tens of degrees and the resulting blend is then molded. The manufacturing process varies with different product shapes. In the manufacture of fiber, for instance, it is well possible to directly extrude the polymers by means of a melt-spinning apparatus without preliminary mixing. A film can be directly manufactured using an inflation molding equipment without preliminary mixing. In these processes, a stabilizer such as an antioxidant or an aging inhibitor is preferably added.

If necessary, an antistatic agent, an inorganic filler, a colorant and so on can be incorporated in the resin composition in suitable proportions.

While the blending ratio (by weight) of components A and B varies with different applications, it is generally 99:1 through 5:95 and preferably 95:5 through 25:75. This blending ratio is related to the porosity of the thermoplastic resin product when component B is thoroughly dissolved out but is not exactly proportional to pore size.

Since generally the strength of a porous resin product is preferably as large as possible, the ideal pore configuration is spherical. It should be noted that complete removal by dissolution is difficult unless the pores are open. Therefore, it is necessary to set the stirring temperature and time and other equipment parameters so that homogenous blending can be achieved taking into consideration the properties (compatibility etc.) of the component resins.

In accordance with the present invention, component B can be quickly dissolved out from the resultant molding using room temperature water, warm water or hot water. More rapid removal is possible when an aqueous solution of alkali or acid is employed. Furthermore, component B can be dissolved out with a mixture of an organic solvent and water but since component A might also be simultaneously dissolved out depending on the type of organic solvent or of component A resin, due care must be exercised in the selection of the organic solvent.

For the manufacture of ultrafine fiber or nonwoven fabric of ultrafine fiber, the thermoplastic resin is preferably at least one member selected from the group consisting of polyester, polyamide and polyacrylonitrile resins (component C).

The polyester that can be used with advantage includes, inter alia, polyethylene terephthalate and polybutylene terephthalate, which may optionally be modified with isophthalic acid or diethylene glycol, for instance.

The polyamide includes all the common species such as nylon 66 (m.p. 255° C.) and nylon 6 (m.p. 215° C.).

The polyacrylonitrile may be one partially copolymerized with vinyl acetate or the like.

The components C and B are melt-spun, in divided state or as a blend.

The term 'divided state' means that components C and B are melted independently and extruded through a special spinneret into a conjugated polymer structure whose cross-section presents defined phases with clear demarcations. Removal of component B from such a conjugated or multiaxial cable structure leaving component C alone gives an assemblage of ultrafine fiber. Thus, this divisional molding process may for example be such that core-sheath structures (each resembling an electric cable consisting of a sheath and a copper conductor) are bundled together to give an integral fiber or a process for producing a ultrafine fiber such that each two adjacent component filament phases are separated by a separator phase which is afterwards removed. In such divisional spinning processes, the use of special nozzles are essential but their advantage is that ultrafine fibers true to specifications can be easily obtained.

The cross-section of the spun fiber may be freely selected. Thus, the fiber may be a honeycomb or radiant structure, a side-by-side structure, or a flower stamen-petal structure, for instance, wherein components C and B are alternately arrayed. Any desired sectional configuration can be obtained by selecting the proper nozzle geometry and the proper feeding pattern for components C and B. Taking the honeycomb structure as an example, there is known a spinning method using a nozzle such that component C is extruded from a multiplicity of inwardly disposed orifices and component B is extruded enternally thereof so as to surround component C.

The term 'blending' as used herein means that a preblend of components C and B is extruded from a spinneret nozzle of the conventional design. Even in such a blending process, the island or islet phase (component C) is stretched at such a high draft ratio that the cross-section of the resulting fiber presents a conjugated pattern and removal of the oceanic phase (component B) leaves a ultrafine fiber.

In these spinning processes, it is sometimes preferable to add a stabilizer such as an antioxidant or an aging inhibitor.

The C/B blending ratio (by weight) is generally 99:1 through 5:95 and preferably 95:5 through 25:75.

The blend is fed to a melt-spinning equipment of the conventional type. The spun fiber is then stretched at a draft ratio of 3 to 5 to give a mix-spun fiber of 1 to 10 D. It is possible to charge components C and B independently into the spinning machine for melt-spinning.

In the manufacture of ultrafine fiber, component B is dissolved out from the spun fiber containing both components C and B using room temperature water, warm water or hot water. The use of an aqueous solution of alkali or acid usually accelerates the removal. While an organic solvent may be used for removal by dissolution, the use of water is preferred in terms of working environment and the risk of fire hazards. While the removal by dissolution may be carried out on the spun fiber, the fiber may first be constructed into a nonwoven fabric, a woven fabric or a knitted fabric and, then, be locally dissolved out. While the use of hot water hastens the removal, cold water is sufficiently effective.

In the manufacture of a nonwoven fabric of ultrafine fiber, the fiber melt-spun from a nozzle is immediately stretched at a draft ratio of 3 to 5 and, then, constructed into a crude nonwoven fabric by spun bonding or, after cutting into staples, by means of a random webber. The adhesion of fiber to fiber is generally accomplished by pressing the crude fabric at a temperature near the melting point of the fiber or by incorporating a low-melting resin powder as a binder. A solution of the binder resin may be sprayed on the fiber. From the resulting crude nonwoven fabric, component B is dissolved out with water to provide a finished nonwoven fabric of ultrafine fiber. In this removal by dissolution, it is possible to apply heat or employ an ultrasonic wave or a water jet, if necessary. It is also possible to use an aqueous solution of acid or alkali.

Thus, in accordance with the manufacturing method of the invention, explosions during the manufacturing process, the risk of fire hazards and adverse effects on health can be obviated and the production time may also be curtailed.

The following examples and comparative examples are merely intended to illustrate the invention in further detail and should by no means be construed as defining the metes and bounds of the invention.

EXAMPLE 1

To 100 parts (by weight, the same applies hereinafter) of polyethylene glycol (weight average molecular weight 10,000) was added 2.2 parts of dimethyl terephthalate and the polyesterification reaction was conducted to give a compound with a weight average molecular weight of 130,000 (hereinafter referred to as high molecular compound B-1).

A kneader was charged with 50 parts of the above high molecular compound B-1 and 100 parts of polypropylene (Nisseki Polypro E310G, Nippon Petrochemicals Co., Ltd.; softening point 132° C.) pellets and kneading was performed at 160° C. for 15 minutes. The resulting mixture was withdrawn and hot-pressed to provide a 100 μm thick sheet. This sheet was then immersed in warm water with stirring at 60° C. for 10 hours. As a result, the sheet turned white and showed a porosity of 29%, an average pore diameter of 3 μm and a tensile strength of 150 kg/cm².

EXAMPLE 2

One-hundred parts of polypropylene glycol (weight average molecular weight 1,000) and 500 parts of ethylene oxide were subjected to addition reaction and the reaction product was further reacted with 17 parts of hexamethylene diisocyanate to give a polyurethane with a weight average molecular weight of 90,000 (hereinafter referred to as high molecular compound B-2).

One-hundred parts of this high molecular compound B-2 was blended with 100 parts of polyamide resin (nylon 6, melt viscosity: 2,850 poises at 280° C.) pellets and the blend was directly molded into a sheet using the T-die of an extruder at a cylinder temperature of 270° C. This mixed resin film (30 μm thick) was caused to travel through a cold water bath maintained at 25° C. at a speed of 30 m/10 minutes, whereby the high molecular compound B-2 was removed. The resulting white sheet had a porosity of 45%, an average pore diameter of 10 μm and a tensile strength of 95 kg/cm².

EXAMPLES 3 AND 4

Porous films were prepared in the same manner as Examples 1 and 2 except that the following compounds B-3 and B-4 were respectively used in lieu of high molecular compounds B-1 and B-2. These films were comparable to the products of Examples 1 and 2 in the above-mentioned quality parameters.

High molecular compound B-3.

A polyester compound with a weight average molecular weight of 100,000 which is obtainable by reacting a polytetramethylene glycol (molecular weight 2,000)-ethylene oxide adduct (weight average molecular weight 10,000) with sebacic acid.

High molecular compound B-4:

A polyethylene glycol (molecular weight 3,000)-pyromellitic anhydride polymer with a weight average molecular weight of 30,000.

COMPARATIVE EXAMPLE 1

A sheet was prepared in the same manner as Example 1 except that polyethylene glycol (weight average molecular weight 20,000) was used in lieu of high molecular compound B-1. However, because of the low viscosity of polyethylene glycol immediately after sheet formation and low strength during coagulation, local shedding occurred to cause a poor surface condition. Moreover, in the hot-pressing stage, the polyethylene glycol migrated out on the surface to cause bleeding.

COMPARATIVE EXAMPLE 2

A sheet was prepared in the same manner as Example 2 except that polystyrene was used in lieu of high molecular compound B-2. This sheet was treated with toluene for dissolution. To achieve 100% removal, it took 5 times as long a time as in Example 2.

EXAMPLE 5

One-hundred parts of the high molecular compound B-1 obtained in Example 1 and 100 parts of polyethylene terephthalate (melt viscosity 2,600 poises at 280° C.) pellets were respectively fed to a divisional melt-spinning apparatus and spun at a spinning temperature of 260° C. and a takeup speed of 1,000 m/min. in such a manner that the polyethylene terephthalate was extruded from the inwardly disposed fine orifices of the nozzle and the high molecular compound B-1 was extruded from outwardly disposed orifices so as to surround the polyethylene terephthalate component. In this manner, an unoriented fiber (monofilament) of 7 D with a honeycomb section was obtained. This unoriented fiber was guided through a water bath at 30° C. over a distance of 10 m to dissolve out the high molecular compound B-1. As a result, a fiber consisting in an assemblage of polyethylene terephthalate filaments wa obtained. This fiber was stretched at a draft ratio of 3.5 at 150° C. to give a ultrafine fiber.

The above fiber could be false-twisted and woven without breakage and other troubles in the weaving step and the product woven fabric has a soft feel.

EXAMPLE 6

One-hundred parts of the high molecular compound B-2 obtained in Example 2 and 100 parts of polyamide resin (nylon 6, melt viscosity 2,850 poises at 280° C.) were fed to the same spinning apparatus as used in Example 5 and the spun fiber was immediately quenched. The fiber was then stretched at a draft ratio of 4 at 45° C.

The resulting stretched fiber was constructed into a woven fabric, from which the high molecular compound B-2 was dissolved out with water to provide a finished woven fabric of ultrafine fiber. While the above dissolution procedure was carried out in a water bath, it took 3 hours to attain a porosity of 45%.

This woven fabric had a delicate hand and a kind feel.

EXAMPLES 7 AND 8

Ultrafine fibers and fabrics of ultrafine fibers were manufactured in the same manner as Examples 5 and 6 except that high molecular compounds B-3 and B-4 were respectively used in lieu of high molecular compounds B-1 and B-2. The resulting fibers and fabrics were all comparable to the products according to Examples 5 and 6.

COMPARATIVE EXAMPLE 3

A fiber was spun in the same manner as Example 5 except that polyethylene glycol (weight average molecular weight 20,000) was used in lieu of high molecular compound B-1. However, on account of the low viscosity of polyethylene glycol immediately after spinning and the low strength during coagulation, the surface condition of the filaments was poor with local shedding, and breakage occurred in the course of takeup.

COMPARATIVE EXAMPLE 4

A spun fiber was manufactured using polystyrene (melt index 3 g/10 min.) in lieu of high molecular compound B-2 under otherwise the same conditions as in Example 6 and after-treated with toluene for dissolution. In order to achieve 100% removal, it took 5 times as long a time as in Example 6.

EXAMPLE 9

One-hundred parts of the high molecular compound B-1 obtained in Example 1 and 100 parts of polyethylene terephthalate (melt viscosity 2,600 poises at 280° C.) pellets were fed to a melt-spinning apparatus equipped with a spinneret nozzle of the conventional type and spun at a spinning temperature of 270° C. and a takeup speed of 1,000 m/min. to provide an unoriented fiber (monofilaments) of 7 D. This unoriented fiber was caused to travel in a water bath at 30° C. to dissolve out the high molecular compound B-1 to thereby give a fiber which is an assemblage of polyethylene terephthalate fibers. This fiber was stretched at a draft ratio of 3.5 at 150° C. to provide an ultrafine fiber of 1 D.

This fiber was false-twisted and woven but there was no trouble such as breakage in the course of weaving and the product fabric had a soft hand.

EXAMPLE 10

One-hundred parts of the high molecular compound B-2 obtained in Example 2 and 100 parts of polyamide resin (nylon 6, melt viscosity 2,850 poises at 280° C.) were fed to the same melt-spinning apparatus as used in Example 9 and the resulting tow was immediately quenched and stretched at a draft ratio of 4 at 45° C.

The stretched fiber thus obtained was woven and treated with water to remove the high molecular compound B-2, whereupon a woven fabric of ultrafine fiber was obtained.

This woven fabric had a soft feel and a good hand.

EXAMPLES 11 AND 12

Ultrafine fibers and fabrics of ultrafine fibers were manufactured in the same manner as Examples 9 and 10 except that high molecular compounds B-3 and B-4 were respectively used in lieu of high molecular compounds B-1 and B-2. The resulting fibers and fabrics were comparable to those manufactured in Examples 9 and 10.

COMPARATIVE EXAMPLE 5

The spinning procedure of Example 9 was repeated except that polyethylene glycol (weight average molecular weight 20,000) was used the lieu of high molecular compound B-1. However, because of the low viscosity of polyethylene glycol immediately after spinning and the low strength during coagulation, the surface condition of the filaments was poor with local shedding and breakage occurred in the course of takeup.

COMPARATIVE EXAMPLE 6

The spinning procedure of Example 10 was repeated except that polystyrene (melt index 3 g/10 min.) was used in lieu of high molecular compound B-2 and the resulting fiber was treated with toluene to dissolve out the polystyrene. To achieve 100% dissolution, it took 5 times as long a time as in Example 10.

EXAMPLE 13

A nylon-6 resin having an intrinsic viscosity of 1.3 (in metacresol, 30° C.), a polyalkylene oxide high molecular compound having a weight average molecular weight of 160,000 and a melt viscosity of 2,000~3,000 poises at 260° C. (prepared by reacting a polyethylene glycol having a weight average molecular weight of 10,000 with dimethyl phthalate for polyesterification; hereinafter referred to as compound B-5) were independently melted in a screw extruder and extruded from a special nozzle to provide a conjugated polymer structure. The ratio of nylon-6, an islet phase, to high molecular compound B-5, an oceanic phase, was 80:20 and the number of islets in cross-section was 6. The resulting tow was stretched in an air jet and randomly loosened in filamentous state with an air diffuser to provide a sheet. This sheet was needle-punched (300/cm$^2$) and then hot-pressed at a pressure of 0.5 kgf/cm$^2$ and a temperature of 220° C. for 2 minutes. Finally, the bonded sheet was passed through a pressurized hot water stream at 80° C. for 5 minutes to substantially remove high molecular compound B-5. In this manner a nonwoven fabric of ultrafine nylon-6 fiber was obtained.

EXAMPLE 14

An isophthalic acid-copolymerized polyethylene terephthalate (m.p. 210° C.) and a polyalkylene oxide high molecular compound having a melt viscosity of 3,000~4,000 poises at 230° C. and a weight average molecular weight of 130,000~160,000 (prepared by reacting a polyethylene glycol having a weight average molecular weight of 5,000 with hexamethylene diisocyanate for polyurethanation; hereinafter referred to as high molecular weight compound B-6) were independently melted in a screw extruder and extruded from a special nozzle to provide a conjugated polymer structure. The ratio of high molecular compound B-6, an oceanic phase, to polyethylene terephthalate, an islet phase, was 90:10 and the number of islets in section was 18. The fiber was further processed as in Example 13 to provide a nonwoven fabric of ultrafine polyester fiber.

EXAMPLE 15

A polyethylene terephthalate (m.p. 260° C.) and a polyalkylene oxide high molecular compound having a weight average molecular weight of 180,000 (prepared by reacting a polyethylene glycol having a weight average molecular weight of 6,000 with pyromellitic anhydride for polyesterification; hereinafter referred to as high molecular compound B-7) were independently melted in a screw extruder and extruded from a special nozzle to provide a conjugated polymer fiber. The ratio of high molecular compound B-7, an oceanic phase, to polyethylene terephthalate, an islet phase, was 80:20 and the number of islets in section was 6. The resulting tow was stretched in an air jet and loosened in filamentous form with an air diffuser to give a sheet. This sheet was needle-punched (300/cm$^2$) and hot-pressed at a temperature of 255° C. and a pressure of 4 kgf/cm$^2$ for 3 minutes. The pressed sheet was exposed to running water at 60° C. to dissolve out the high molecular compound B-7. In this manner a nonwoven fabric of ultrafine polyester fiber was obtained.

EXAMPLE 16

A polyethylene terephthalate (m.p. 260° C.) and an isophthalic acid-copolymerized polyethylene terephthalate (m.p. 210° C., intrinsic viscosity 1.25 as measured in metacresol at 30° C.) were independently melted and extruded from a special nozzle to provide a core-sheath composite fiber. The tow was stretched and shorn into particulate form.

On the other hand, a conjugated polymer fiber prepared in the same manner as Example 15 was cut into 3 mm lengths and mixed with the above particulate fiber and using a random webber, a web was constructed. Otherwise, the procedure of Example 13 was followed to provide a nonwoven fabric of ultrafine polyester fiber.

EXAMPLE 17

A polyacrylonitrile having an intrinsic viscosity of 1.2 (in dimethylformamide, 30° C.) and a high molecular compound having a weight average molecular weight of 130,000 (obtainable by reacting a polyethylene glycol with a weight average molecular weight of 10,000 with pyromellitic anhydride for polyesterification) were mix-melted in a volume ratio of 4:6 in a screw extruder at 230° C. and the mixture was extruded. The resulting tow was stretched in an air jet and, then, loosened in random filamentous state with an air diffuser to prepare a sheet. This sheet was needle-punched (400/cm$^2$) and, then, treated in a pressurized hot water current at 80° C. for 15 minutes. The above procedure provided a nonwoven fabric of ultrafine polyacrylonitrile fiber.

COMPARATIVE EXAMPLE 7

The procedure of Example 13 was repeated except that a polyethylene oxide with a weight average molecular weight of 300,000~500,000 was used in lieu of high molecular compound B-5. While no serious trouble was encountered in the preparation of a conjugated fiber, even washing with pressurized hot water at 80° C. for one hour did not thoroughly remove the pore-leaving resin (polyethylene oxide).

We claim:

1. A method for manufacturing a porous resin molding, which is characterized by melt-blending a thermoplastic resin and a high molecular compound having a weight average molecular weight of not less than 10,000 which is obtainable by reacting a polyalkylene oxide compound, which is available on addition polymerization of an organic compound containing two active hydrogen groups and an alkylene oxide containing ethylene oxide, with a polycarboxylic acid or an anhydride or a lower alkyl ester thereof, or a diisocyanate, molding the resulting mixture, and removing said high molecular compound from the molding by dissolution with water or an aqueous medium.

2. A method according to claim 1, which is further characterized in that said molding is a film.

3. A method for manufacturing a ultrafine fiber, which is characterized by providing a melt-spun fiber containing at least one member selected from the group consisting of polyester, polyamide and polyacrylonitrile and a high molecular compound with a weight average molecular weight of not less than 10,000 which is obtainable by reacting a polyalkylene oxide compound, which is available on addition polymerization of an organic compound containing two active hydrogen groups and an alkylene oxide containing ethylene oxide, with a polycarboxylic acid or an anhydride or lower alkyl ester thereof, or a diisocyanate, and dissolving out said high molecular compound from the melt-spun fiber with water or an aqueous medium.

4. A method according to claim 3, which is further characterized in that at least one member selected from the group consisting of polyester, polyamide and polyacrylonitrile and said high molecular compound are independently melted and divisionally spun into a spun fiber.

5. A method according to claim 3, which is further characterized in that a mixture of at least one member selected from the group consisting of polyester, polyamide and polyacrylonitrile and said high molecular compound is melt-spun into a spun fiber.

6. A method for manufacturing a ultrafine fiber nonwoven fabric, which is characterized by providing a melt-spun fiber containing at least one member selected from the group consisting of polyester, polyamide and polyacrylonitrile and a high molecular compound with a weight average molecular weight of not less than 10,000 which is obtainable by reacting a polyalkylene oxide compound, which is available on addition polymerization of an organic compound containing two active hydrogen groups and an alkylene oxide containing ethylene oxide, with a polycarboxylic acid or an anhydride or lower alkyl ester thereof, or a diisocyanate, preparing a crude nonwoven fabric using said melt-spun fiber, and dissolving out said high molecular compound from the crude nonwoven fabric with water or an aqueous medium.

7. A method according to claim 6, which is further characterized in that at least one member selected from the group consisting of polyester, polyamide and polyacrylonitrile and said high molecular compound are independently melted and divisionally spun into a spun fiber.

8. A method according to claim 6, which is further characterized in that a mixture of at least one member selected from the group consisting of polyester, polyamide and polyacrylonitrile and said high molecular compound is melt-spun into a spun fiber.

* * * * *